No. 852,492. PATENTED MAY 7, 1907.
G. BITZER.
HUB ATTACHING DEVICE.
APPLICATION FILED MAR. 22, 1906.

Witnesses
J. H. Yeomans
C. H. Griesbauer

Inventor
GOTTLIEB BITZER.
by H. B. Willson & Co.
Attorneys

UNITED STATES PATENT OFFICE.

GOTTLIEB BITZER, OF TURNERS FALLS, MASSACHUSETTS.

HUB-ATTACHING DEVICE.

No. 852,492.   Specification of Letters Patent.   Patented May 7, 1907.

Application filed March 22, 1906. Serial No. 307,505.

*To all whom it may concern:*

Be it known that I, GOTTLIEB BITZER, a citizen of the United States, residing at Turners Falls, in the county of Franklin and State of Massachusetts, have invented certain new and useful Improvements in Hub-Attaching Devices; and I do declare the following to be a full, clear, and exact description of the invention, such as will enable others skilled in the art to which it appertains to make and use the same.

My invention relates to improvements in devices for locking nuts upon the spindles of vehicle wheels for retaining the hubs upon the spindles.

The object of the invention is to provide a simple, durable and efficient hub attaching device of this character, which will be comparatively inexpensive to manufacture and well adapted for the purpose intended.

With the above and other objects in view, the invention consists of certain novel features of construction, combination and arrangement of devices, hereinafter described and claimed.

Figure 1:
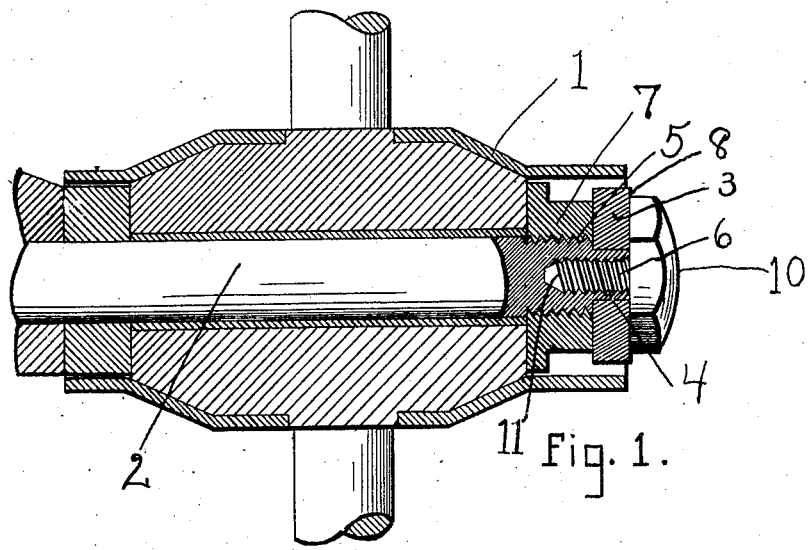
Figure 2:
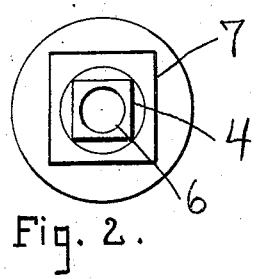
Figure 3:
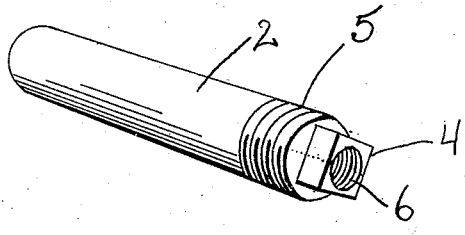
Figure 4:
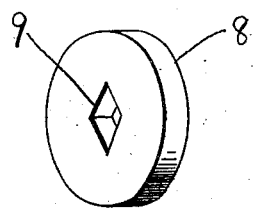
Figure 5:
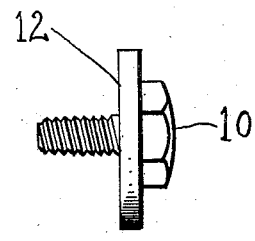

In the accompanying drawings,—Figure 1 is a longitudinal sectional view of the spindle and hub of a vehicle wheel, showing my improved locking nut for retaining the hub upon the spindle; Fig. 2 is an end view of the spindle and nut with the locking washer and retaining screw removed; Fig. 3 is a detail view of the end of the spindle; Fig. 4 is a detail view of the locking washer; and Fig. 5 is a detail view of the retaining screw having a modified form of head thereon.

Referring to the drawings by numeral, 1 denotes the hub of a vehicle wheel, 2 a spindle for said hub, and 3 my improved nut lock or device for retaining the hub thereon. This locking device consists in forming the spindle 2 with a square or polygonal-shaped outer end 4, with large or coarse external screw-threads 5, and with smaller or finer internal screw-threads 6. The threads 5 are adapted to be engaged by similar threads formed in the usual nut 7, which is here shown as of square form with an annular flange at its inner end. The square or polygonal portion 4 at the end of the spindle is provided to receive a locking washer or disk 8, which is formed with a central opening 9, corresponding in shape to the cross-section of the portion 4, and corresponding in thickness to the length of said portion. The washer and the nut are retained upon the spindle by a screw 10, which has its threaded portion 11 screwed into the threaded bore 6 of the spindle, and its head engaged with the outer face of the washer. The head of the screw may be large and of polygonal form, as shown in Fig. 1, or it may be small, but of polygonal form, and formed with an annular flange 12 upon its inner face to serve as a washer, as shown in Fig. 5. It will be seen that by constructing the parts in this manner and having the threads 5 and 6 of different size and pitch, it will be impossible for the screw or the nut to work loose, so that the hub will be effectively retained upon the spindle, and at the same time it may be quickly and easily removed by first removing the screw, then the washer, and then the nut.

From the foregoing description, taken in connection with the accompanying drawings, the construction and operation of the invention will be readily understood without requiring a more extended explanation.

Having thus described my invention, what I claim as new, and desire to secure by Letters-Patent, is,—

A hub attaching device comprising a spindle, the upper end of which is recessed axially and screw-threaded internally and externally, the upper end of the spindle being reduced and provided with an angular periphery, a nut engaging the external threads and having its outer face extending out to the inner end of said reduced portion, a washer on the reduced portion extending flush with the tip of the spindle, and having an angular opening corresponding with the outline of the reduced portion, and a screw in the recess of the spindle having an enlarged head which engages with the outer end of the spindle and with the outer face of the washer.

In testimony whereof I have hereunto set my hand in presence of two subscribing witnesses.

GOTTLIEB BITZER.

Witnesses:
ANDREAS FAUST,
JOHN L. BITZER.